(12) United States Patent
Salihi

(10) Patent No.: US 10,945,113 B2
(45) Date of Patent: *Mar. 9, 2021

(54) AIRTIME CARD FOR THE SALE AND ACTIVATION OF WIRELESS SERVICE FOR A WIRELESS DEVICE

(71) Applicant: TracFone Wireless, Inc., Miami, FL (US)

(72) Inventor: Dana Salihi, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/736,307

(22) Filed: Jan. 7, 2020

(65) Prior Publication Data

US 2020/0145805 A1     May 7, 2020

Related U.S. Application Data

(63) Continuation of application No. 14/976,769, filed on Dec. 21, 2015, now Pat. No. 10,531,261.

(60) Provisional application No. 62/094,480, filed on Dec. 19, 2014.

(51) Int. Cl.
| | | |
|---|---|---|
| *H04W 4/80* | (2018.01) | |
| *H04B 5/00* | (2006.01) | |
| *H04M 17/00* | (2006.01) | |
| *H04W 12/08* | (2021.01) | |
| *H04W 12/06* | (2021.01) | |

(52) U.S. Cl.
CPC ............ *H04W 4/80* (2018.02); *H04B 5/0031* (2013.01); *H04M 17/206* (2013.01); *H04M 17/207* (2013.01); *H04M 17/301* (2013.01); *H04M 17/307* (2013.01); *H04W 12/0608* (2019.01); *H04W 12/08* (2013.01)

(58) Field of Classification Search
CPC ..... H04W 4/008; H04W 12/08; H04W 12/06; H04W 4/001; H04W 8/18; H04W 8/183; H04M 1/72527; H04M 3/42136; H04M 3/42144; H04M 3/42153; H04M 3/42161; H04M 3/4217; H04M 3/42178; H04B 5/0031

See application file for complete search history.

(56) References Cited

U.S. PATENT DOCUMENTS

| | | |
|---|---|---|
| 6,386,457 B1 | 5/2002 | Sorie |
| 8,781,905 B2 | 7/2014 | Rau et al. |
| 9,613,345 B2 | 4/2017 | Salihi |

(Continued)

*Primary Examiner* — Magdi Elhag
(74) *Attorney, Agent, or Firm* — BakerHostetler

(57) ABSTRACT

An airtime card and associated methods of using the airtime card for the sale and/or authorization of wireless services is disclosed. The methods and airtime card include the use of an airtime card with a near field communication tag with a unique identifier code used to improve a user's experience and ease of authorization/provisioning of services for the wireless device. In some aspects, the unique identifier may be protected by a security code programmed at the point-of-sale of the airtime card. The services to be purchased and authorized may include at least one of the following: out of the box activation, device upgrades, device reactivations, wireless number changes, wireless number porting, and the addition or purchasing of services including airtime, data, and/or SMS enrollments or data content.

20 Claims, 8 Drawing Sheets

(56) References Cited

U.S. PATENT DOCUMENTS

| | | | |
|---|---|---|---|
| 9,877,191 B2 | 1/2018 | Martinez | |
| 10,531,261 B2 * | 1/2020 | Salihi | ................ H04W 12/0608 |
| 2010/0201310 A1 | 8/2010 | Vorenkamp et al. | |
| 2010/0294835 A1 | 11/2010 | Bam et al. | |
| 2015/0332247 A1 | 11/2015 | Winfield et al. | |
| 2016/0180312 A1 | 6/2016 | Salihi | |
| 2016/0192184 A1 | 6/2016 | Salihi | |

* cited by examiner

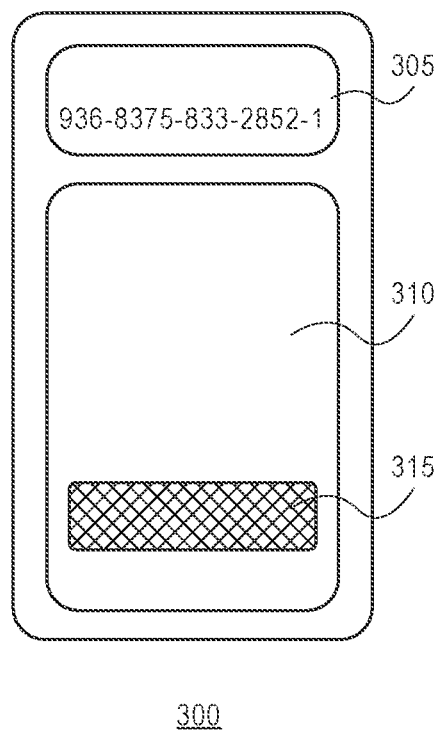
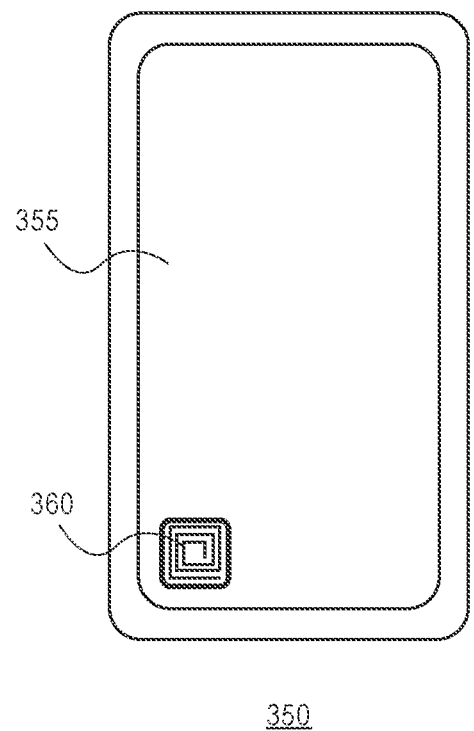
FIG. 3A
(PRIOR ART)
FIG. 3B

AIRTIME CARD FOR THE SALE AND ACTIVATION OF WIRELESS SERVICE FOR A WIRELESS DEVICE

CROSS REFERENCE TO PRIOR APPLICATIONS

This application is a continuation of U.S. application Ser. No. 14/976,769 filed on Dec. 21, 2015, now the U.S. Pat. No. 10,531,261 issued Jan. 7, 2020, which is hereby incorporated by reference in its entirety for all purposes as if fully set forth herein; and which application claims the benefit from U.S. Provisional Application No. 62/094,480 filed on Dec. 19, 2014, which is hereby incorporated by reference for all purposes as if fully set forth herein.

BACKGROUND OF THE DISCLOSURE

1. Field of the Disclosure

The disclosure relates to an airtime card for the sale and activation of wireless services on wireless devices. More particularly, the disclosure relates to methods for activating wireless services on wireless devices using an airtime card with a near field communication tag.

2. Related Art

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used.

The services provided by both the MNOs and MVNOs often implement activation cards, also known as airtime cards, for the sale and activation and/or addition of a wireless service, e.g. talk airtime, data, or text messaging. Activation cards generally include a unique code that may include a scratch off area obscuring the unique code. Codes are correlated to a wireless service and must be recorded in a service provider's database prior to distributing the activation card to a respective point-of-sale and reaching the customer. A record of every airtime card distributed is therefore kept for the activation of the corresponding wireless service until the card becomes obsolete through redemption or expiration. Once a card is sold to a user, the user must manually scratch off the covering of the code and manually enter the code and for activation of the wireless service. Codes are generally made long and complex to prevent unauthorized use of the codes to activate non-purchased wireless services.

Convenience, timeliness, and reliability of the wireless providers' backend systems are key factors that play into a user's experience. By developing a system to improve at least these factors, a more positive experience can be provided to the user. The improved experience will help retain customer base and increase the number of customers willing to purchase wireless services from MNOs and MVNOs. In order to do so, the following needs can be addressed by enabling new improved systems that can be implemented for the activation of a wireless service.

A need exists to decrease the amount of processing of the backend systems of wireless providers to provide faster activation of wireless services. In particular, a solution for a simplified and safe way to maintain and manage inventory of airtime cards used for the activation of wireless services is desired.

Another need in the art also exists for an error free and more expedient method and system for customers to extend cellular services using airtime cards.

A further need exists in the art for a method, system and application to enable wireless providers and retailers to sell and authenticate wireless services in convenient locations, including transient locations, in an expedited manner, and without compromising unauthorized activation of services or the security of the wireless providers' backend systems.

Accordingly, a more convenient, secure, and time efficient approach is needed for the sale and activation of wireless services.

SUMMARY OF THE DISCLOSURE

The foregoing needs are met, to a great extent, by the disclosure, providing a system and associated methods for activating services and subscriptions on wireless devices and/or systems implementing a near field reader. In particular, the disclosure is intended to solve the challenges by using a near field communication tag with at least one unique identifier that corresponds to a purchased/selected wireless service and/or subscription. According to some aspects of the disclosure, the services requested to be activated may include at least one of initial provisioning or activation, device upgrades, device reactivations, wireless number changes, the addition or purchasing of services including airtime, data and text messaging, enrollments or content, and wireless number porting for wireless devices that have already been activated.

According to aspects of the disclosure, an airtime card for the sale and/or activation of wireless services is disclosed. The airtime card including a near field communication tag having a unique identifier corresponding to a wireless service. The unique identifier can be configured to be transmitted, using a near field communication reader of a wireless device, to a processor of the wireless device. At least a portion of the transmitted unique identifier can be used for an authorization message that can be transmitted to a wireless provider for the authorization of the wireless service corresponding to the unique identifier.

According to some additional aspects, a method of authorizing wireless services is disclosed. The method including: providing an airtime card for the authorization of a wireless service including a near field communication tag, the near field communication tag including a unique identifier corresponding to the wireless service offered by the airtime card; and configuring the unique identifier to be received by a near field communication reader of a wireless device.

In yet additional aspects of the disclosure, the method of authorizing wireless services can include: providing an airtime card for the authorization of a wireless service including a near field communication tag, the near field communication tag having a unique identifier corresponding to the wireless service offered by the airtime card; and transmitting to a near field communication reader of a wireless device the unique identifier.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above-mentioned features and aspects of the disclosure will become more apparent with reference to the following description taken in conjunction with the accompanying drawings wherein like reference numerals denote like elements and in which:

FIG. 3A illustrates a conventional airtime card used for the sale and activation of a wireless service;

FIG. 3B illustrates an airtime card with a near field communication tag that can be used according to aspects of the disclosure;

DETAILED DESCRIPTION

Figure 1:
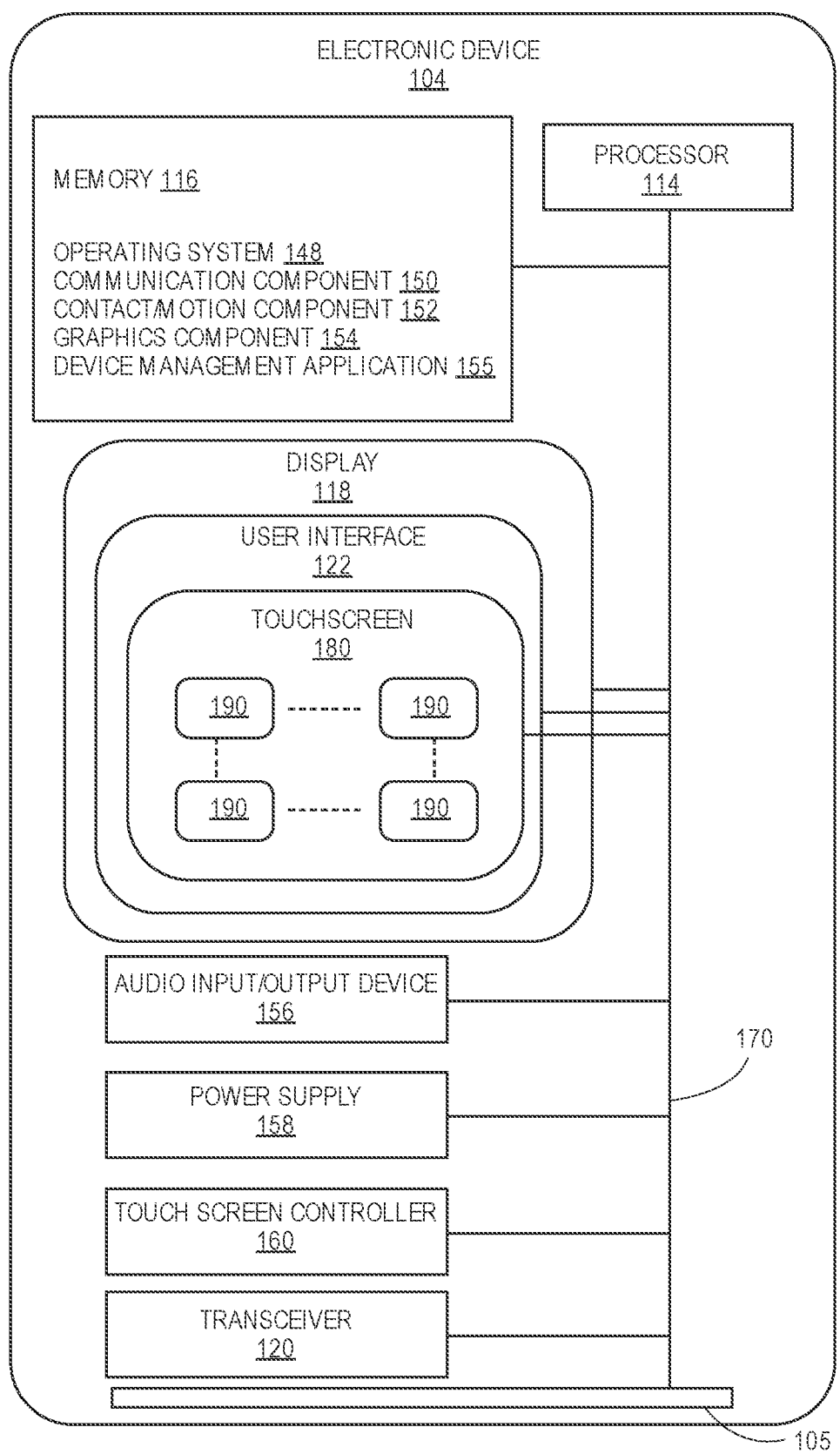
FIG. 1 illustrates a block diagram with exemplary components of a wireless device in accordance with aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone." With respect to remote alert devices, data transmission over a wireless network, including on a pre-paid basis using a near field communication card, is contemplated for alarm fobs, wireless remote camera devices, vehicle monitoring systems, home based security systems that do not require a landline or use both a landline and a wireless network for added reliability, and similar systems where wireless network authorization may be provided with a near field communication card. The vehicle monitoring system may include a vehicle communication interface, components to determine vehicle operation, and/or the like. The home-based security system may include door sensors, window sensors, motion detectors, interface devices, and/or the like.

A "point-of-sale" as used herein can refer to a location where one or more wireless devices and/or services can be sold and/or activated which may or may not require sales personnel. A point-of-sale can include, for example, a vending machine, an automated kiosk, a retailer store, a gas station, and such.

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G (Fifth Generation) that may utilize the teachings of the present application to sell, activate, monitor, redeem, and/or track, the activation of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Referring now to FIG. 1, a block diagram with exemplary components of a wireless device 104 in accordance with aspects of the disclosure is shown. In particular, the exemplary components which include a near field communication interface 105, e.g., reader or scanner, which may be used in conjunction with one or more near field communication tag(s) (shown in FIG. 3B) during the distribution, verification, and/or sale/purchase, of a wireless service. Other uses of the near field communication interface 105 for the activation of a wireless service can include but are not limited to a change of phone settings, an activation message (e.g. text message) to be created and sent, starting of an app. (e.g. payment app.), and the such.

The near field communication interface 105 can be in communication with a processor 114, a memory 116, and a user interface 122. The processor 114 may be a central processing unit configured to execute instructions such as instructions related to software programs. Any processor can be used for the electronic device as understood to those of ordinary skill in the art. The display 118 may be a liquid crystal display (LCD). Preferably the LCD includes a backlight to illuminate the various color liquid crystals to provide a more colorful display. The user interface 122 may be any type of physical input as readily employed in the field. For example, the user interface 122 may have physical buttons. Alternatively, the user interface 122 may be implemented on a touchscreen 180, a motion sensor (not shown), and the such. Finally, the wireless device 104 may include a power supply 158.

The memory 116 of the wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM, UICC, cloud-based memory, flash memory or the like. These various components may be connected through various communication lines including a data bus 170.

The wireless device 104 can include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to analog converter for audio input and output functions respectively.

In another aspect, the wireless device 104 may include a transceiver 120. The wireless device 104 may provide radio and signal processing as needed to access a wireless network for services. The processor 114 may be configured to process call functions, data transfer, and the like and provide an array of services, based on those functions, to the user.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus and/or, in some aspects, for example, the touchscreen 180 may serve as the near field communication interface 105 when the near field communication tag(s) include a conductive component. Additionally, the wireless device 104 may further include a touch screen controller 160.

In one operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 may execute an application in the processor 114 associated with the object 190 that is stored in the memory 116. Additionally or alternatively, touching an object 190 may open a menu of options to be selected by the user. The display 118 may include a plurality of objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touchscreen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files and operational options with graphical images. During operation, the user may select and activate various graphical images displayed on the display 118 in order to initiate functions and tasks associated therewith.

In another aspect of the disclosure, the memory 116 of the wireless device 104 can include a database for storing user information. The user information may include information such as full name, address, email address, contact number, credit card information, and the like. In one aspect, the database may include security questions. In another aspect, the database may include user specified preferences.

In yet another aspect of the application, the memory 116 of the wireless device 104 can include a wireless service activation application 155. The application 155 may be preinstalled or downloaded from an application store. The wireless service activation application 155 may be configured to control use of the wireless device 104 based on interaction with a wireless provider backend server (shown in FIG. 4) and/or one or more near field communication tag(s) (shown in FIG. 3B) for the activation of a wireless service. The wireless service activation application 155 may utilize an internal accounting module to establish an account with a representation of prepaid funds or available credit for wireless services. In some aspects, the internal accounting module of the wireless service activation application 155 may also be used to store and/or transmit a plurality of charge rates as well as a billing/payment algorithm. The internal accounting module can classify each wireless service (data, voice, SMS) into one of a plurality of billing categories; receive data correlated to the near field communication tag(s) identifier, select a charge rate corresponding to that billing category; calculate an appropriate charge for the data usage, voice usage, and SMS usage in real time by using the selected charge rate; and apply this appropriate charge to the account. For example, upon the retrieval and/or verification of a unique identifier of a near field communication tag by the near field communication interface 105, the one or more steps may automatically take place to apply an appropriate charge to the account.

In some aspects, once the internal accounting module determines that the amount of wireless service (data, voice, SMS) used has depleted the account zero, the processor 114 may interact with the internal accounting module and/or the wireless provider backend system to limit, prevent, alert the user, and/or control further use of the wireless device 104 as further described herein. The controlled use can include suspending voice calls, allowing limited voice calls, allowing all voice calls, suspending text messages, allowing limited text messages, allowing all text messages, suspending wireless data service, limiting wireless data service, throttling wireless data service, and allowing all wireless data service. In this aspect, the wireless service activation application 155 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a near field communication tag, the host processor may be capable of ascertaining the operating codes needed to activate that particular wireless device or needed to set its account amount.

Figures 2A, 2B:
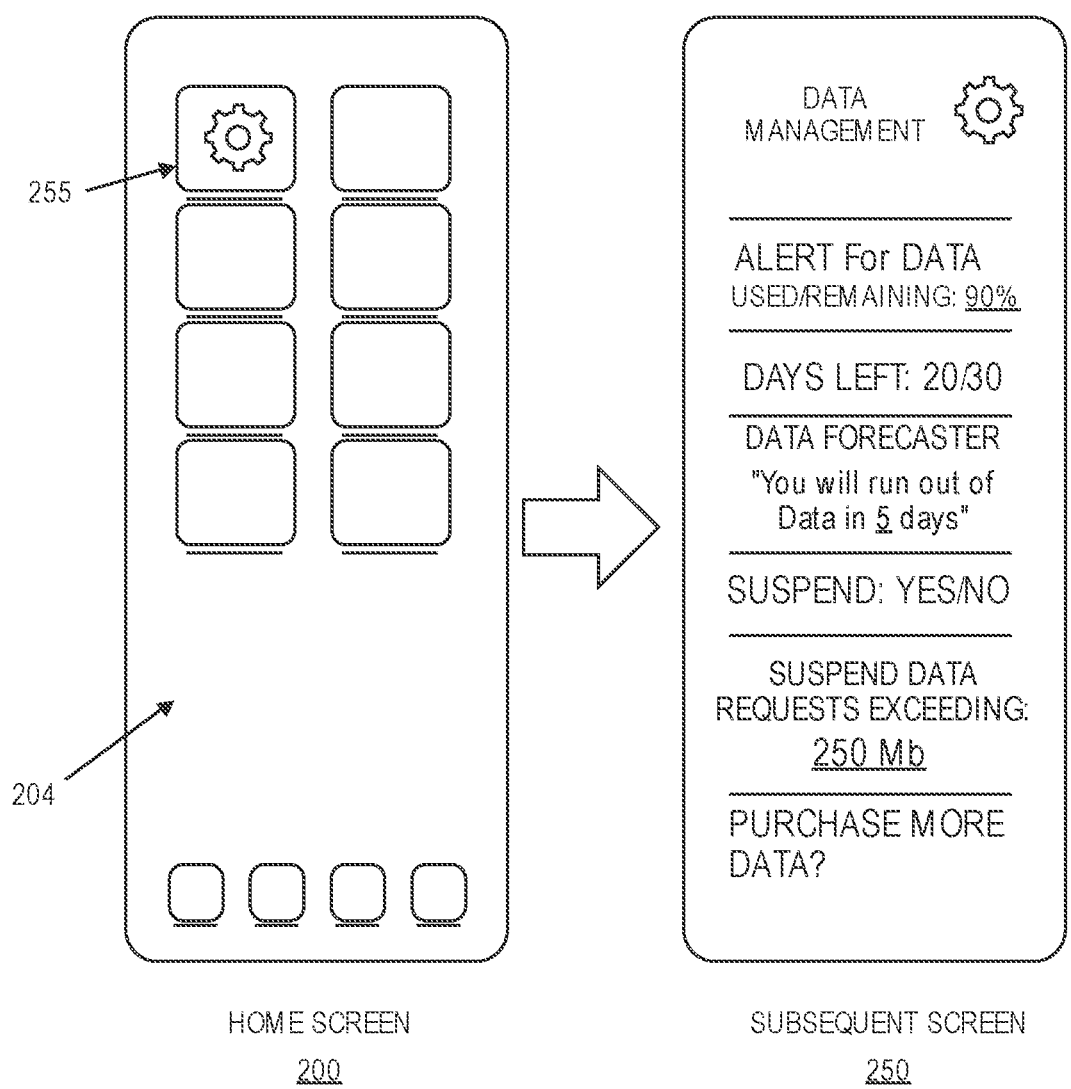
FIG. 2A illustrates an exemplary wireless device with a display of a home screen and FIG. 2B a subsequent screen of a wireless service activation application with a graphical user interface, both which may be used for the selection and control of the activation of a wireless service in accordance with an aspect of the disclosure.

FIG. 2A illustrates an exemplary wireless device with a display of a home screen and FIG. 2B a subsequent screen of a wireless service activation application with a graphical user interface, both which may be used for the selection and control of the activation of a wireless service in accordance with an aspect of the disclosure. The home screen 200 may include a plurality of icons, e.g. 204, and may include but is not limited to a calling icon, texting icon, internet icon, and the like, allowing a user to perform one or more functions on the wireless device 104. For example, the home screen 200 may also display icons for one or more applications that have been downloaded from the Internet or pre-installed, and unlocked/retrieved using one or more near field communication tag(s). In some aspects, an application such as Google Wallet™, Google Play™, Android Market™, Apple Store™, or the like, may also function with the one or more near field communication tag(s) to process a payment during the activation of one or more selected wireless service.

Some of the payment and/or authentication applications may be stored in a robust manner that prevents a user from deleting, modifying, tampering, and the like, with the application's functionality. In this regard, the activation service application 255, for example, can provide data management information, as depicted in subsequent screen 250, but may not allow or limit user's input for the activation and/or control of the wireless services. Further, in some aspects the provision of the options depicted in the subsequent screen 250 to the user may only be made available during activation of a wireless service and verification of a unique identifier of a near field communication tag.

Referring now to FIG. 3A, a conventional airtime card used for the sale and activation of a wireless service is depicted. In particular, the conventional airtime card 300 may include a unique code 315, located under a scratch-off panel, which must be manually entered into the phone after the retailer accepts payment. The unique code 315 under the scratch-off panel is often long, i.e. 16-digit code, and its use is inconvenient, time consuming, and error prone. Shortening the code however can compromise the security of the system and allow for unauthorized activation of services. Further, because the code must be kept hidden until payment has been accepted, although it is not tamper proof and is inconvenient, the scratch-off panel is needed as a cost-effective means to keep the unique code 315 hidden as it has previously been recorded and correlated to a credit amount for a particular wireless service in backend system's database.

Prerecording and correlating the unique code 315 in the wireless provider backend system's database has certain drawbacks. Mainly because after the conventional airtime card 300 is distributed to the point-of-sale/customer, the correlated service for each unique code 315 cannot be practically changed. This inadequacy limits how and where the conventional airtime card 300 can be sold to the consumer as the danger of scratch-off panel tampering to obtain the wireless services in a fraudulent manner/without payment exists. The sale of these conventional airtime cards 300 as a result must be sold by a clerk and kept under surveillance.

Further, the conventional airtime card 300 often includes a second code or a bar code 305 correlating the service provided by the unique code 315 to a price for the wireless service offered and advertised 310. The offered and advertised service 310 includes the wireless service provider and the specific amount of data and/or time being sold by each conventional airtime card 300. This requires that the point-of-sale (shown in FIG. 4 as 420) keep a number of conventional airtime cards 300 with different plan options in stock for each of the service providers. Because some wireless services, amounts, and companies, may sell more than others, a large stock must be maintained at each point-of-sale 420.

Referring now to FIG. 3B, an airtime card 350 with a near field communication tag 360 according to aspects of the disclosure is illustrated. In particular, the airtime card 350 can include a near field communication tag 360 including data that can correspond to a wireless service. In some aspects, more than one near field communication tag 360 can be included in the airtime card 350. The near field communication tag 360 may have either read only data capability or may have rewriteable data capability. As such, configurability, memory, security, data retention and write endurance, may all vary according to the activation application. The various variations of the near field communication tags included and number of tags which can be utilized to streamline the wireless service activation process, provide a more secure sale and activation process, provide for less data storage in backend databases, post distribution programmability of the airtime cards, and eliminate point-of-sale requirements.

One skilled in the art will appreciate from this disclosure that the airtime card 350 with the near field communication tag 360 can but does not need to be in the form of a card. Convenience, size, and ease of use may call for a smaller keychain type of airtime cards. In some aspects, for example, the data from the near field communication tag 360 may be may be transferred to a digital credit card type of device at the point-of-sale 420. More importantly, according to some aspects of the disclosure a near field communication equipped wireless device, e.g. smart phone or remote alarm device, can be paired with the near field communication tag 360 to automate a task including, for example, a change in phone settings, a text to be created and sent, an app. to be launched, or any number of commands to be executed, for the purchase/sale, payment, activation of a wireless service, and/or monitoring of wireless services sold/authorized. As previously mentioned, it is to be understood that the airtime card is not limited to the sale of "minutes" but can include any other type of data transmission over the wireless network which that be sold as a service.

The label of the airtime card 350 may also include a generic label 355 that corresponds to more than one type/amount of wireless service, and/or in some aspects, a wireless carrier. This may be achieved when using a reprogrammable near field communication tag 360 which can be programmed during the selection and payment, for example. By providing for reprogramming capability of the near field communication tag 360 during the selection and payment, the selection of airtime cards 350 that must be kept in inventory at the point-of-sale 420 can be significantly reduced. Further, by simply bringing the near field communication enabled wireless device to a distance of 10 cm or less, the activation and purchase of wireless services can be automated and streamlined. For example, quicker verification of codes can result since the system is more secure and the need of storing all unique codes and correlated services on a backend system's database prior to distribution is eliminated. Further, the need for the scratch off panel and manual transmission of the complex unique code is also eliminated even in the simplest implementations.

Figure 4:
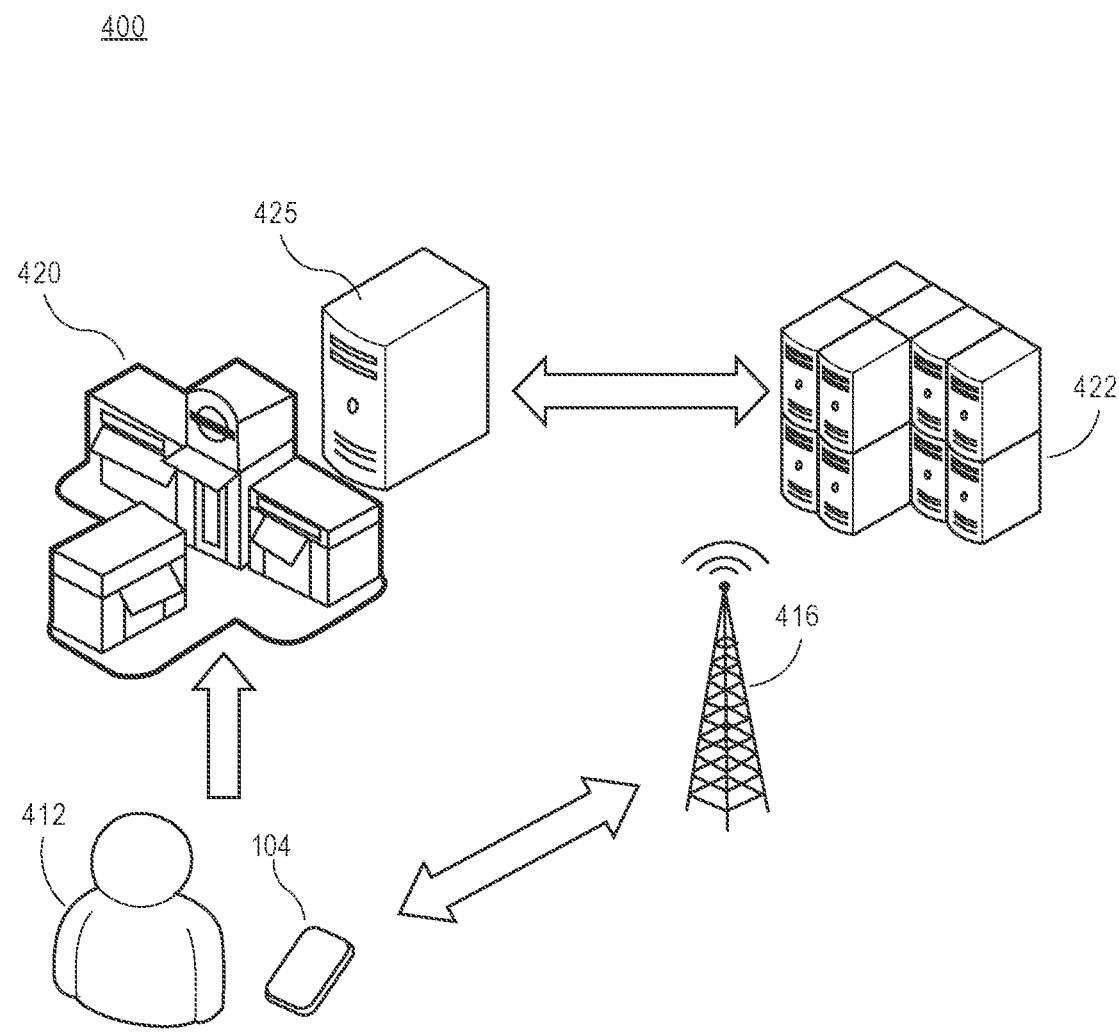
FIG. 4 illustrates a schematic diagram of an exemplary wireless service activation system in accordance with aspects of the disclosure.

Referring now to FIG. 4, a schematic diagram of an exemplary wireless service activation system according to aspects of the disclosure is depicted. In particular, the wireless service activation system 400 can be used to activate wireless network service(s) on a wireless device 104 implementing various aspects of the near field communication systems disclosed. Unlike conventional activation processes for wireless devices that can require a user 412 to contact a live customer service representative, utilize an interactive voice response system from a landline or another wireless device, or access an Internet website by the user 412 to use a website activation system and enter long activation codes to activate services on a wireless device, the present wireless service activation system 400 can be used to activate a wireless device 104 and/or activate services with automated code/information gathering and without requiring access to an agent, website, or general wireless or landline telephone system.

According to aspects of the disclosure, the activated service(s) may include, for example, activation of a wireless service after or during the initial activation of the wireless device 104 by a user 412. The initial activation of the wireless device 104 may be described herein as "out of the box" activation and may take place at the point-of-sale 420. In some additional aspects, the services requested to be activated are one or combinations of: airtime, text messaging, and data plans, but may also include at least one of device upgrades, device reactivations, wireless number changes, and wireless number porting for wireless devices that have previously been activated. The wireless device 104 services activated may include a mobile phone, a smartphone, a wireless computing device or laptop, a tablet, a wireless handheld device, a mobile computing device, or other type of wireless device having services that can be activated wirelessly.

According to some aspects of the disclosure, the point-of-sale 420 can include, for example, a store retailer, a vending machine, a kiosk, and the such, which may also include a near field communication system 425 that can be used for payment and/or executing security and activation protocols using one or more near field communication tag(s) 360. Further, the near field communication system 425 at the point-of-sale 420 can be configured to communicate with the near field communication tag 360 and in some aspects the wireless device 104, which may also be configured to be in communication with a wireless provider backend system 422. Communication with the wireless device 104 may include, for example, one or more of: communication using the wireless device near field communication interface 105, a wire connector, a data messaging channel, such as an Unstructured Supplementary Service Data (USSD) channel, a Short Message Service (SMS) messaging channel or a Wireless Application Protocol (WAP) messaging channel, a personal area network (PAN), such as a Bluetooth™ communication, an induction wireless communication, an infrared wireless communication, an ultra-wideband communication, a ZigBee™ communication, a wireless fidelity communication channel, a local area network (LAN) or a communication channel as defined herein.

Communication between the near field communication system 425 of the point-of-sale 420 and the wireless device 104 may be used to transmit a payment for a wireless service and/or automatically retrieve and/or generate wireless device-related information based on a user's input selection. According to some aspects of the disclosure, the wireless service selection can be made by scanning a near field communication tag 360 of an airtime card 350 using the near field communication interface 105 of the wireless device 104, and can include a wireless provider selection, and/or a wireless service type and amount to be activated. In some aspects, the near field communication tag 360 can further be scanned by the near field communication system 425 at the point-of-sale 420, for example, for verification, authorization, and/or security encryption.

The wireless service selection, near field communication tag 360 unique identifier, and wireless device 104 related information may be transferred to a wireless provider backend system 422. The wireless device-related information can include, for example, the International Mobile Station Equipment Identify ("IMEI"), an Electronic Serial Number (ESN), Mobile Equipment Identifier (MEID), and/or a serial number for a subscriber identity module (SIM) card installed in the wireless device 104. The SIM card may include a SIM card memory for storing at least a SIM card serial number, for example, an Integrated Circuit Card ID (ICCID). A wireless device not utilizing a SIM card is contemplated as well for use with the disclosure.

In some aspects, the information transferred may be in the form of an activation message that corresponds and/or includes the wireless provider and/or wireless service selection by the user 412 and automatically retrieved wireless device related information, the near field communication tag 360 unique identifier, and/or payment/authorization verification from the point-of-sale 420. The activation message including the automatically retrieved information can be generated by a processor including, for example, the processor of the wireless device 104 and/or a processor at the point-of-sale 420. In some aspects, the activation message may be transmitted over a provisioning channel provided over a provisioning wireless carrier network 416 that is available to inactive or unprovisioned wireless devices or via any type of conventional activation protocols known in the art. Alternatively, the activation message can be transmitted from the point-of-sale 420 via any wired or other wireless communication type to the wireless provider backend system 422. The wireless provider backend system 422 can include one or more databases wherein authorized unique identifiers of a near field communication tag 360 may be correlated/recorded when a wireless service is redeemed and/or purchased.

Although it is not required in some aspects, the provisioning wireless carrier network 416 may be used to receive the activation message via the provisioning channel and forward the activation message in real time to a subscriber provisioning wireless carrier network 416 operated by a service provider for the activation of one or more services for the wireless device 104. Accordingly, the services requested to be activated can include at least one of: an initial "out of the box" activation of wireless services of an unprovisioned wireless device 104 or device upgrades, device reactivations, wireless number changes, the addition or purchasing of services including airtime, enrollments or content, and wireless number porting for wireless devices 104 that have previously been activated or provisioned. In some aspects, the provisioning wireless carrier network 416 can be connected to a wireless carrier server and forward the activation message to the subscriber provisioning wireless carrier network 416, either directly or through a destination server connected to the subscriber provisioning wireless carrier network 416, to initiate service activation and provisioning of the wireless device 104.

Figure 5:
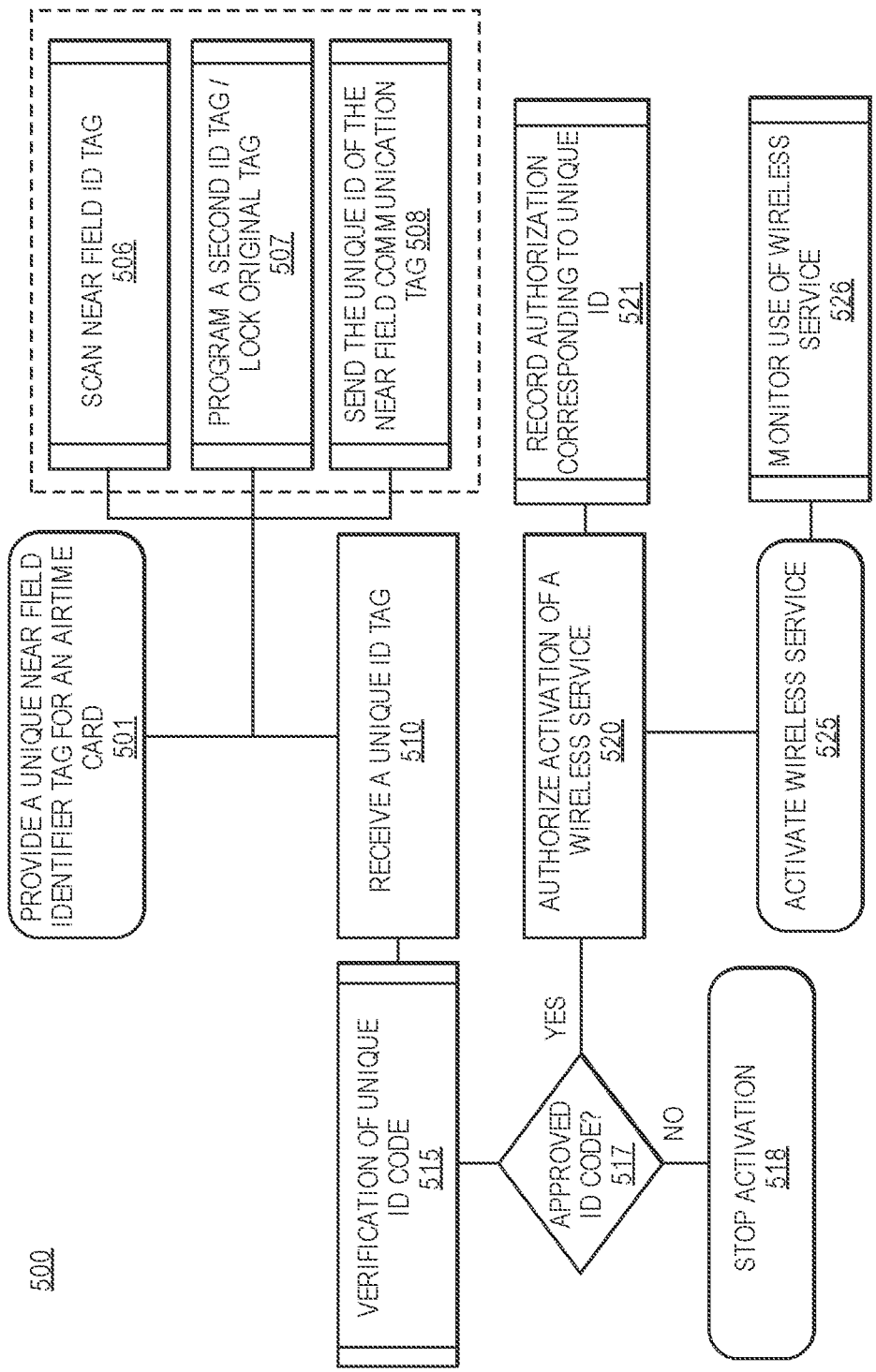
FIG. 5 illustrates exemplary method steps which may be used to implement the system of the disclosure.

Referring now to FIG. 5, exemplary method steps which may be used to implement systems of the disclosure are depicted in a flowchart 500. In particular, the method steps include ways in which the near field communication tag 360 of the airtime card 350 and the near field communication interface 105 of the wireless device 104 can be implemented to activate one or more wireless service(s) on the wireless device 104. At step 501, a near field communication tag 360 is provided for an airtime card 350 during manufacturing. The unique near field communication tag 360 may include a programmed identifier that can correspond to a wireless provider selection and one or more wireless service to be activated. For example, the identifier may include a first code corresponding to a wireless provider, followed by a second code corresponding to a wireless service type, and followed by a third code corresponding to an amount. It is contemplated that additional codes may be included for additional services and amounts, security codes, as well as for production data for statistical analysis performed by the wireless provider, as it may be desired. Each of the codes may be merged into a single code that includes, for example, a series of digits including letters, symbols, and/or numbers.

In some aspects, all of the codes, e.g. first code-third code, may be programmed to provide a unique identifier of the near field communication tag 360 during manufacturing and prior to distribution of the airtime cards 350 to the point-of-sale 420. However, in some aspects, only the first code may be programmed during manufacturing leaving the others to be programmed at the point-of-sale 420. This may be implemented when it is desired to reduce the number of airtime cards 350 that are distributed in order to reduce inventory at each of the points-of-sale 420 or increase security to prevent unintended redemption of wireless services.

At step 506, a near field communication tag 360 can be scanned using the near field communication interface 105 of the wireless device 104 and/or the near field communication system 425 at the point-of-sale 420. At step 507, a second near field communication tag 360 may be provided at the point-of-sale 420 depending on the wireless service, or combination of wireless services, selection made by the user 412. Alternatively or in addition to providing a second near field communication tag, at 507, the original near field communication tag 360 may be locked. Locking of the near field communication tag 360 may include encryption with the wireless device 104 information and/or programming of an additional code into the near field communication tag to generate a unique identifier for the airtime card 350 and/or selection. At step 508, the locked identifier of step 506 may be transmitted to the wireless provider backend system 422.

At step 510 the unique near field communication tag 360 codes along with wireless device 104 information is received by the wireless provider backend system 422. At step 515, the wireless provider backend system 422 can verify the unique identification code by searching for the unique identification code in one or more databases to make sure the unique identification code has not been recorded/redeemed previously. At step 517, if the system finds the unique identification code is not approved, the activation of the wireless service will be stopped 518. Upon stopping the activation 518 of the wireless service, the wireless provider backend system 422 may send a warning message to the user 412 (e.g., using the wireless device 104) and/or the wireless provider. Alternatively at step 520, if when the unique identification code is approved (authentic, not been previously used, or the like), authorization of a wireless service, including payment verification, may take place. At step 521, the authorized unique identification code is recorded in a database of the wireless provider before, after, or during, the activation, of step 525, of the wireless service on the wireless device 104 takes place. At step 526, the use of the wireless service activated may be monitored to determine when the corresponding wireless service has been expended by the user 412.

Figure 6:
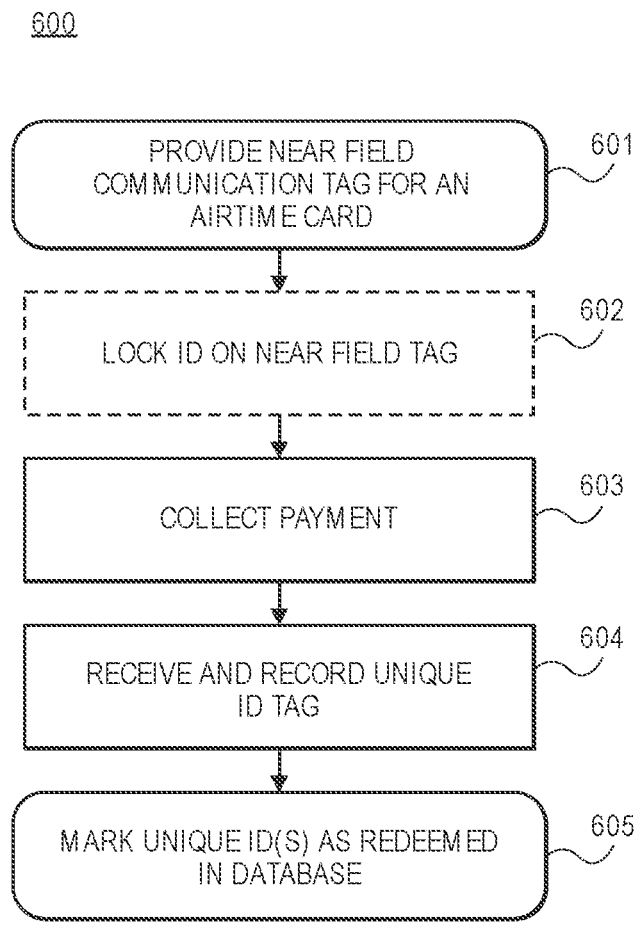
FIG. 6 illustrates an operational flow diagram with exemplary method steps that may be used for activating a wireless service on a wireless device at the point-of-sale according to aspects of the system of the disclosure.

Referring now to FIG. 6, an operational flow diagram 600 with exemplary method steps that may be used for selling and activating a wireless service on a wireless device at the point-of-sale according to aspects of the system of the disclosure is shown. In particular, the method steps which may be performed by one or more processors for the sale and activation of one or more wireless services at the point-of-sale 420. At step 601, a near field communication tag 360 for an airtime card 350 is provided. The near field communication tag 360 may be programmed with a unique identification code at the time of production before or after it is embedded onto the airtime card 350. No record of the unique identification code is required to be kept in the wireless provider backend system 422.

Optionally at step 602, the unique identifier may be locked on the tag to prevent it from being tampered with. Locking of the unique identifier may include, for example, encryption and/or the programming of a second code onto the near field communication tag 360 at the point-of-sale 420. Locking or unlocking of the unique identifier code may include entering a confirmation code found, for example, in a receipt provided at the point-of-sale, sent to the wireless device as a text message, found on an application installed on the wireless device and/or the like. At step 603, before or after the unique identifier is locked, payment is collected for the wireless service to be activated and corresponding to the unique identifier. After payment is confirmed, at step 604, the unique identifier of the near field communication tag 360 of the airtime card 350 can be submitted to the wireless provider backend system 422 to be recorded in a database. For example, the recording may be done in an active database that may be used for verification of active wireless services. During redemption, the unique identifier code(s) programmed may be processed along with information corresponding to the wireless device 104 in which the services are to be activated on by the wireless provider backend system 422 for service activation. The wireless device 104 information can include for example the international mobile station equipment identity (IMEI), the mobile equipment identifier (MEID), the SIM card unique identifier and/or the like. At step 605, after activation of the wireless service purchased, the unique identifier code(s) would be marked as redeemed in the database of the wireless provider backend system 422 to prevent duplicate redemption.

Figure 7:
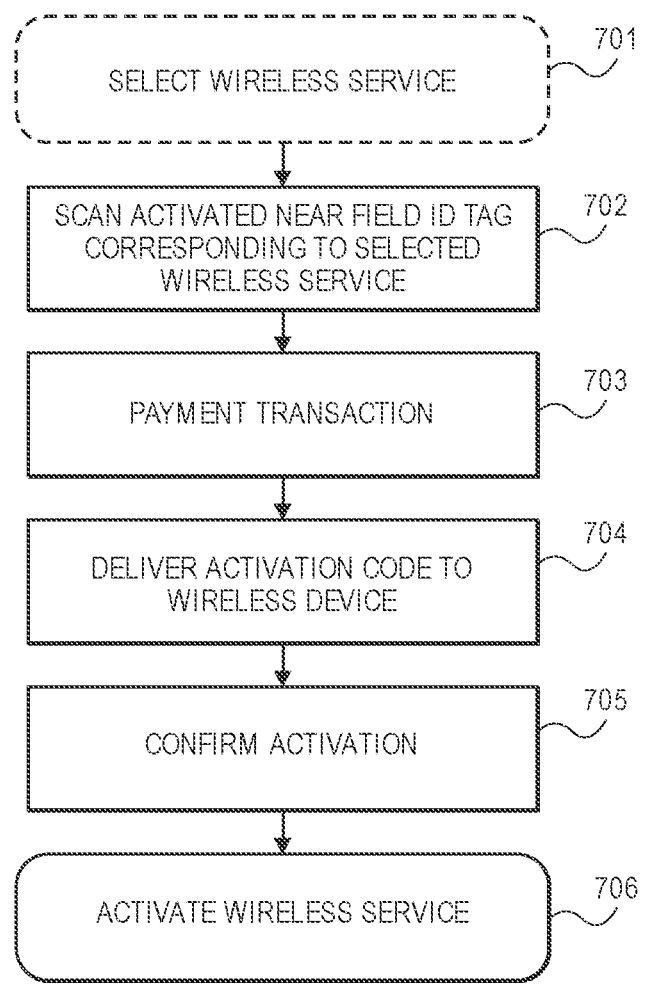
FIG. 7 illustrates an operational flow diagram with exemplary method steps that may be used for selling and activating a wireless service at the point-of-sale using a near field communication tag of an airtime card according to aspects of the disclosure.

Referring now to FIG. 7, an operation flow diagram 700 with exemplary method steps that may be used for selling and activating a wireless service at the point-of-sale 420 using a near field communication tag of an airtime card according to aspects of the present disclosure is shown. In particular, method steps that be performed by a computer to facilitate the sale of a wireless service at a point-of-sale are provided. At step 701, the user 412 or purchaser can select the wireless service, i.e. plan to be purchased, by terminal selection at the point-of-sale 420. At step 702, the near field communication tag 360 of an airtime card 350 may be scanned using a near field communication interface. The near field communication interface can include for example, a near field communication reader/scanner at the register and in communication with the computer system at the point-of sale, and/or the near field communication interface 105 of the wireless device 104. At step 703, payment transaction for the purchase of the wireless service may be completed via a digital wallet payment application installed on the wireless device. Digital wallet applications can include but are not limited to, for example, Google Wallet™, PayPal™, Amazon Payments™, and the such. According to some aspects, in some aspects the digital wallet application can be used to transmit a payment to the payment processing register at the point-of-sale. Accordingly, the payment processing register can receive the unique identifier of a near field communication card and receive payment either through a salesperson or a digital wallet application.

At step 704, the activation code can be delivered to the wireless device 104 on which the wireless service is to be activated. For example, a near field communication transaction can be initiated by the point-of-sale 420 near field communication system 425 to launch a preinstalled near field communication activation application on the wireless device 104 and to deliver the activation code to the wireless device 104. The preinstalled near field communication activation application may automatically gather phone information including, for example, one or more of: the ESN, the IMEI, the MEID and the like of the wireless device 104, which can be used with the activation code during the activation of the wireless services. Optionally or in addition to, the preinstalled near field communication activation application and/or the activation code, could be delivered to an email account associated with the digital wallet, via the provisioning wireless carrier network 416, or a LAN network. At step 705, the user 412 may confirm the activation using the wireless device 104. At step 706, the user may elect to activate the wireless service at the time of purchase or save the activation code for future use.

Figure 8:
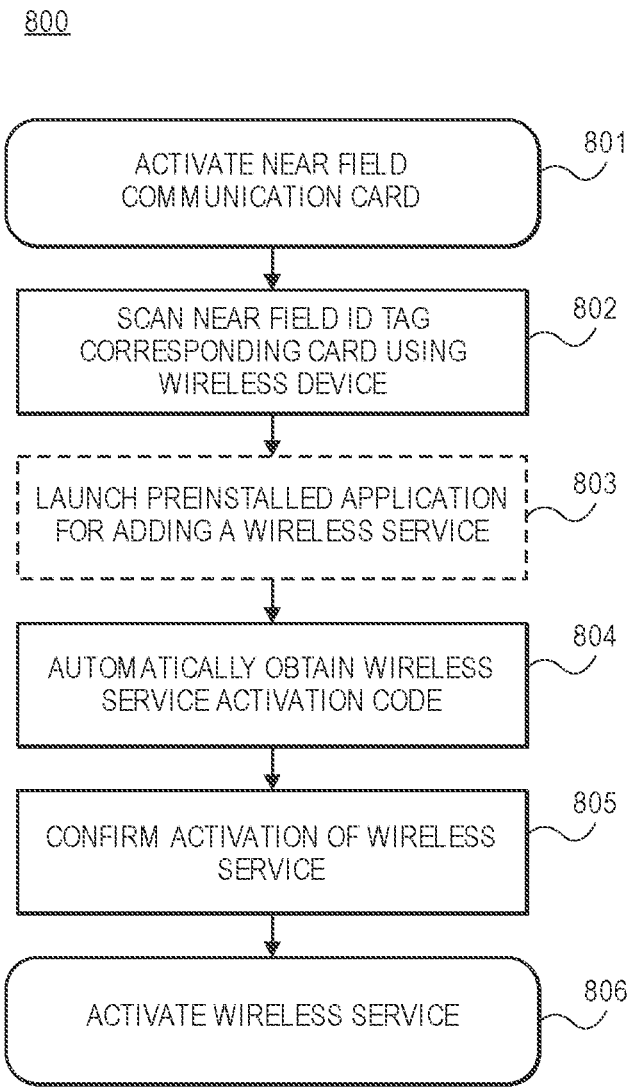
FIG. 8 illustrates an operational flow diagram with exemplary method steps that may be used for implementing an airtime card with a near field communication tag according to aspects of the disclosure.

Referring now to FIG. 8, an operation flow diagram 800 with exemplary method steps that may be used for implementing an airtime card with a near field communication tag according to aspects of the disclosure is shown. In particular, method steps to provide a significantly faster and decrease errors associated with the use of airtime cards are disclosed. At step 801, the near field communication tag 360 can be activated at the point-of-sale 420. Activation can include receiving payment, verification of the unique identifier, and/or locking of the unique identifier codes. As previously mentioned, in some aspects, locking or unlocking of the unique identifier code may include entering a confirmation code found, for example, in a receipt provided at the point-of-sale, sent to the wireless device as a text message, and/or found on an application installed on the wireless device. At step 802, the near field communication tag 360 including the activated unique identifier code may be scanned using the near field communication interface 105 of the wireless device 104. Optionally at step 803, the wireless device 104 may launch a preinstalled application that may be used to add the wireless service. At step 804, the near field communication tag 360 of the airtime card 350 is read by the application and the locked unique identifier can be obtained from the near field communication tag 360. The user 412 can then, at step 805, confirm the activation of the wireless services that correspond to the unique identifier using the preinstalled application for adding airtime services. At step 806, the application can add the airtime to the wireless device using for example, a provisioning wireless carrier network 416 and the wireless provider backend system 422 of the wireless provider.

Accordingly, the disclosure provides a system and associated methods for activating services and subscriptions on wireless devices and/or systems implementing a near field reader. The disclosure solves the above-noted challenges by using a near field communication tag with at least one unique identifier that corresponds to a purchased/selected wireless service and/or subscription.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation such as a wireless device, server, point-of-sale device. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A system for authorization of prepaid wireless services, the system comprising:
    an airtime card including a near field communication tag, the near field communication tag including a unique identifier corresponding to a prepaid wireless service, wherein said unique identifier is configured to be transmitted, using a near field communication reader of a wireless device, to a processor of the wireless device;
    a wireless service backend system configured to receive at least a portion of said unique identifier transmitted in an authorization message transmitted to the wireless service backend system from the wireless device for authorization of the prepaid wireless service corresponding to the unique identifier stored in the near field communication tag of the airtime card; and
    the wireless service backend system further configured to search a database for the unique identifier to confirm that the unique identifier is authentic, and the wireless service backend system further configured to authorize the prepaid wireless service based on a confirmation that the unique identifier is authentic,
    wherein a point-of-sale is further configured to receive a selection of wireless service type;
    wherein the point-of-sale is configured to communicate with the near field communication tag of the airtime card and the point-of-sale is configured to transmit the unique identifier of the near field communication tag of the airtime card to the wireless service backend system in response to a payment transaction;
    wherein the wireless service backend system is configured to monitor a usage of the prepaid wireless service by the wireless device;
    wherein the wireless service backend system is further configured to receive the unique identifier from the point-of-sale in response to the payment transaction and the wireless service backend system is further configured to record the unique identifier of the near field communication tag of the airtime card in the database of the wireless service backend system when the airtime card is purchased; and
    wherein the wireless service backend system is configured to limit a usage of wireless service by the wireless device once the prepaid wireless service has been expended.

2. The system of claim 1, wherein:
    the point-of-sale is configured to transmit the selection of wireless service type and the unique identifier of the near field communication tag of the airtime card to the wireless service backend system; and
    wherein the prepaid wireless service includes one or more of: wireless data, text messaging, and wireless talk time.

3. The system of claim 1, wherein:
the wireless device is configured to execute an activation application with a processor of the wireless device, the activation application executed by the wireless device reads the unique identifier of the near field communication tag of the airtime card, and the activation application executed by the wireless device transmits the unique identifier of the near field communication tag of the airtime card and wireless device information to the wireless service backend system in an authorization message; and
wherein the prepaid wireless service includes one or more of: wireless data, text messaging, and wireless talk time.

4. The system of claim 1, wherein:
the point-of-sale is further configured to transmit the selection of wireless service type and the unique identifier of the near field communication tag of the airtime card to the wireless service backend system; and
the wireless device is configured to execute an activation application with a processor of the wireless device, the activation application executed by the wireless device reads the unique identifier of the near field communication tag of the airtime card, and the activation application executed by the wireless device transmits the unique identifier of the near field communication tag of the airtime card and wireless device information to the wireless service backend system in an authorization message.

5. The system of claim 1, wherein:
the wireless service backend system is further configured to receive wireless device information, that is included in the authorization message, from the wireless device;
the wireless device information comprises at least one of the following: International Mobile Station Equipment Identity (IMEI), an Electronic Serial Number (ESN), a Mobile Equipment Identifier (MEID), a serial number for a subscriber identity module (SIM), or an Integrated Circuit Card Identification (ICCID);
the prepaid wireless service includes one or more of: wireless data, text messaging, and wireless talk time,
the near field communication tag is a radio frequency identification chip that include ISO/IEC 14443 protocols;
the unique identifier is recorded in a database of the wireless service backend system when the airtime card is purchased; and
the unique identifier recorded in the database is verified by the wireless service backend system when the prepaid wireless service is redeemed.

6. The system of claim 1, wherein:
the point-of-sale is further configured to transmit the selection of wireless service type and the unique identifier of the near field communication tag of the airtime card to the wireless service backend system;
the wireless device is configured to execute an activation application with a processor of the wireless device, the activation application executed by the wireless device reads the unique identifier of the near field communication tag of the airtime card, and the activation application executed by the wireless device transmits the unique identifier of the near field communication tag of the airtime card and wireless device information to the wireless service backend system in an authorization message;
the wireless service backend system is further configured to receive the wireless device information, that is included in the authorization message, from the wireless device;
the wireless device information comprises at least one of the following: International Mobile Station Equipment Identity (IMEI), an Electronic Serial Number (ESN), a Mobile Equipment Identifier (MEID), a serial number for a subscriber identity module (SIM), or an Integrated Circuit Card Identification (ICCID); and
the prepaid wireless service includes one or more of: wireless data, text messaging, and wireless talk time.

7. The system of claim 1, wherein:
the wireless service backend system is further configured to receive wireless device information, that is included in the authorization message, from the wireless device; and
the unique identifier recorded in the database is verified by the wireless service backend system when the prepaid wireless service is redeemed.

8. The system of claim 1, wherein:
the wireless service backend system is further configured to receive wireless device information, that is included in the authorization message, from the wireless device;
the wireless service backend system is further configured to search the database for the unique identifier to determine that the unique identifier is not approved and the wireless service backend system is further configured to stop authorization of the prepaid wireless service based on a determination that the unique identifier is not approved;
the unique identifier is recorded in a database of the wireless service backend system when the airtime card is purchased;
the unique identifier recorded in the database is verified by the wireless service backend system when the prepaid wireless service is redeemed;
the wireless service backend system is implemented by a mobile virtual network operator; and
the prepaid wireless service includes one or more of: wireless data, text messaging, and wireless talk time.

9. A method of authorizing wireless services for a wireless device, the method comprising:
providing an airtime card for the authorizing of a prepaid wireless service, the airtime card including a near field communication tag, the near field communication tag including a unique identifier corresponding to the prepaid wireless service associated with the airtime card;
configuring the unique identifier to be received by a near field communication reader of the wireless device;
communicating with the near field communication tag of the airtime card with a point-of-sale;
receiving a selection of wireless service type at the point-of-sale;
transmitting the unique identifier of the near field communication tag of the airtime card to a wireless service backend system with the point-of-sale in response to a payment transaction with the point-of-sale;
transmitting the unique identifier of the near field communication tag of the airtime card to the near field communication reader of the wireless device;
transmitting the unique identifier of the near field communication tag of the airtime card from the wireless device to the wireless service backend system in an authorization message;
receiving the unique identifier of the near field communication tag of the airtime card in the wireless service backend system from the wireless device, the wireless service backend system configured to receive at least a portion of said unique identifier of the near field communication tag of the airtime card in the authorization message transmitted to the wireless service backend system from the wireless device for the authorization of the prepaid wireless service corresponding to the unique identifier stored in the near field communication tag of the airtime card;

searching with the wireless service backend system a database for the unique identifier of the near field communication tag of the airtime card to confirm that the unique identifier of the near field communication tag of the airtime card is authentic and authorizing with the wireless service backend system the prepaid wireless service based on a confirmation that the unique identifier of the near field communication tag of the airtime card is authentic;

monitoring with the wireless service backend system a usage of the prepaid wireless service by the wireless device; and limiting with the wireless service backend system a usage of wireless service by the wireless device once the prepaid wireless service has been expended, wherein the unique identifier of the near field communication tag of the airtime card is recorded in a database of the wireless service backend system when the airtime card is purchased.

10. The method of claim 9, wherein:

the wireless service backend system is further configured to receive wireless device information, that is included in the authorization message, from the wireless device;

the wireless device information comprises at least one of the following: International Mobile Station Equipment Identity (IMEI), an Electronic Serial Number (ESN), a Mobile Equipment Identifier (MEID), a serial number for a subscriber identity module (SIM), or an Integrated Circuit Card Identification (ICCID); and the prepaid wireless service includes one or more of: wireless data, text messaging, and wireless talk time.

11. The method of claim 9, wherein:

the unique identifier is recorded in a database of the wireless service backend system when the airtime card is purchased; and the unique identifier recorded in the database is verified by the wireless service backend system when the prepaid wireless service is redeemed.

12. The method of claim 9, wherein:

the wireless service backend system is further configured to receive wireless device information, that is included in the authorization message, from the wireless device;

the wireless device information comprises at least one of the following: International Mobile Station Equipment Identity (IMEI), an Electronic Serial Number (ESN), a Mobile Equipment Identifier (MEID), a serial number for a subscriber identity module (SIM), or an Integrated Circuit Card Identification (ICCID);

the prepaid wireless service includes one or more of: wireless data, text messaging, and wireless talk time, the unique identifier is recorded in a database of the wireless service backend system when the airtime card is purchased; and the unique identifier recorded in the database is verified by the wireless service backend system when the prepaid wireless service is redeemed.

13. The method of claim 9, further comprising transmitting the selection of wireless service type and the unique identifier of the near field communication tag of the airtime card to the wireless service backend system by the point-of-sale.

14. The method of claim 9, wherein:

the wireless service backend system is implemented by a mobile virtual network operator; and the prepaid wireless service includes one or more of: wireless data, text messaging, and wireless talk time.

15. The method of claim 9, wherein:

the point-of-sale is further configured to receive a selection of wireless service type and the point-of-sale is configured to transmit the selection of wireless service type and the unique identifier of the near field communication tag of the airtime card to the wireless service backend system; and the prepaid wireless service includes one or more of: wireless data, text messaging, and wireless talk time.

16. The method of claim 9, wherein:

the wireless device is configured to execute an activation application with a processor of the wireless device, the activation application executed by the wireless device reads the unique identifier of the near field communication tag of the airtime card, and the activation application executed by the wireless device transmits the unique identifier of the near field communication tag of the airtime card and wireless device information to the wireless service backend system in an authorization message; and the prepaid wireless service includes one or more of: wireless data, text messaging, and wireless talk time.

17. The method of claim 9, further comprising:

executing an activation application with a processor of the wireless device;

reading the unique identifier of the near field communication tag of the airtime card in response to the activation application executed by the wireless device; and transmitting the unique identifier of the near field communication tag of the airtime card and wireless device information to the wireless service backend system in an authorization message in response to the activation application executed by the wireless device.

18. The method of claim 17, further comprising:

searching with the wireless service backend system the database for the unique identifier of the near field communication tag of the airtime card to determine that the unique identifier is not approved and stopping authorization of the prepaid wireless service with the wireless service backend system based on a determination that the unique identifier of the near field communication tag of the airtime card is not approved, wherein the unique identifier of the near field communication tag of the airtime card is configured to form part of the authorization message that is sent to the wireless service backend system for the authorizing of the prepaid wireless service.

19. The method of claim 18, additionally comprising:

authorizing the prepaid wireless service on the wireless device by the wireless service backend system upon receipt of the authorization message in the wireless service backend system.

20. The method of claim 19, additionally comprising:

receiving with the wireless service backend system the unique identifier of the near field communication tag of the airtime card from the point-of-sale in response to a payment transaction; and recording, in the database of the wireless service backend system, the unique identifier corresponding to authorized prepaid wireless service at a time of purchase of the airtime card.

\* \* \* \* \*